(12) United States Patent
Edwards et al.

(10) Patent No.: US 7,858,731 B2
(45) Date of Patent: *Dec. 28, 2010

(54) POLYESTER RESINS AND POLYESTER CONTAINERS HAVING REDUCED FRICTIONAL PROPERTIES

(75) Inventors: Walter Lee Edwards, Harrisburg, NC (US); Carl Steven Nichols, Waxhaw, NC (US); Robert Joseph Schiavone, Matthews, NC (US); Sharon Sue Griffith, Charlotte, NC (US); Tony Clifford Moore, Charlotte, NC (US)

(73) Assignee: Wellman, Inc., Bay St. Louis, MS (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/129,310

(22) Filed: May 29, 2008

(65) Prior Publication Data

US 2008/0226856 A1    Sep. 18, 2008

Related U.S. Application Data (60) Division of application No. 11/670,644, filed on Feb. 2, 2007, now abandoned, which is a division of application No. 10/962,167, filed on Oct. 8, 2004, which is a continuation-in-part of application No. 10/628,077, filed on Jul. 25, 2003, now Pat. No. 6,803,082, which is a continuation of application No. 09/738,150, filed on Dec. 15, 2000, now Pat. No. 6,599,596.

(51) Int. Cl.
*C08G 64/00* (2006.01)
*C08G 63/02* (2006.01)

(52) U.S. Cl. .................... 528/272; 264/176.1; 264/219; 428/35.7; 428/36.3; 524/81; 524/115; 525/437; 528/271; 528/487; 528/489; 528/491; 528/503

(58) Field of Classification Search ............ 264/176.1, 264/219; 428/35.7, 36.3; 524/81, 115; 525/437; 528/487, 503, 271, 272, 489, 491

See application file for complete search history.

(56) References Cited

U.S. PATENT DOCUMENTS

| | | | |
|---|---|---|---|
| 3,368,995 A | 2/1968 | Furukswa et al. |
| 3,516,957 A | 6/1970 | Gray et al. |
| 3,538,045 A | 11/1970 | Stewart et al. |
| 3,553,157 A | 1/1971 | Diikstra et al. |
| 3,624,024 A | 11/1971 | Caldwell et al. |
| 3,859,245 A | 1/1975 | Stieler et al. |
| 3,884,870 A | 5/1975 | Dodson et al. |
| 3,956,008 A | 5/1976 | Knepper et al. |
| 3,968,183 A | 7/1976 | Hayashi et al. |
| 4,132,707 A | 1/1979 | Borman |
| 4,224,264 A | 9/1980 | Ort et al. |
| 4,312,960 A | 1/1982 | Ort et al. |
| 4,365,031 A | 12/1982 | Massey et al. |
| 4,368,284 A | 1/1983 | Tawada et al. |
| 4,374,949 A | 2/1983 | Massey et al. |
| 4,412,888 A | 11/1983 | Fremont |
| 4,414,352 A | 11/1983 | Cohen et al. |
| 4,430,468 A | 2/1984 | Schumacher |
| 4,434,258 A | 2/1984 | Schumacher et al. |
| 4,434,276 A | 2/1984 | Horlbeck et al. |
| 4,443,573 A | 4/1984 | Wells et al. |
| 4,450,200 A | 5/1984 | Iwato et al. |
| 4,451,606 A | 5/1984 | Campbell |
| 4,460,731 A | 7/1984 | Kochanowski et al. |
| 4,467,051 A | 8/1984 | Finax et al. |
| 4,492,782 A | 1/1985 | Williams et al. |
| 4,504,608 A | 3/1985 | Kishida et al. |
| 4,536,531 A | 8/1985 | Ogawa et al. |
| 4,555,533 A | 11/1985 | Ambros et al. |
| 4,595,715 A | 6/1986 | Kuze et al. |
| 4,607,075 A | 8/1986 | Baum et al. |
| 4,643,921 A | 2/1987 | Terabe et al. |
| 4,643,925 A | 2/1987 | Smith et al. |
| 4,654,399 A | 3/1987 | Callander et al. |
| 4,677,150 A | 6/1987 | Chako et al. |
| 4,699,942 A | 10/1987 | Weaver et al. |
| 4,713,407 A | 12/1987 | Bailey et al. |
| 4,778,858 A | 10/1988 | Ginnings |

(Continued)

FOREIGN PATENT DOCUMENTS

CA        2236638        11/1998

(Continued)

OTHER PUBLICATIONS

Opposition Brief filed in the European Patent Office by Ciba Speciality Chemical on Dec. 8, 2005 against European Patent No. 1341836.

(Continued)

*Primary Examiner*—Terressa M Boykin
(74) *Attorney, Agent, or Firm*—Summa, Additon & Ashe, P.A.

(57) ABSTRACT

The invention embraces polyester resins and containers that include surface-modified talc. The invention also embraces a method for the late introduction of surface-modified talc via a reactive carrier to achieve a polyester resin that is capable of being formed into low-haze, high-clarity bottles possessing reduced coefficient of friction.

37 Claims, 3 Drawing Sheets

U.S. PATENT DOCUMENTS

| | | | |
|---|---|---|---|
| 4,786,673 | A | 11/1988 | Morival et al. |
| 4,795,771 | A | 1/1989 | Yoshihara et al. |
| 4,820,347 | A | 4/1989 | Weber |
| 4,898,897 | A | 2/1990 | Kiyohara et al. |
| 4,908,428 | A | 3/1990 | Bastioli et al. |
| 4,927,874 | A | 5/1990 | Weber |
| 4,929,482 | A | 5/1990 | Moritani et al. |
| 4,931,493 | A | 6/1990 | Weber |
| 4,948,665 | A | 8/1990 | Rosen et al. |
| 4,970,256 | A | 11/1990 | Inoue et al. |
| 4,981,896 | A | 1/1991 | Okada et al. |
| 4,983,660 | A | 1/1991 | Yoshida et al. |
| 4,994,518 | A | 2/1991 | Morin et al. |
| 5,000,871 | A | 3/1991 | Minayoshi et al. |
| 5,008,230 | A | 4/1991 | Nichols |
| 5,039,717 | A | 8/1991 | Kawakami et al. |
| 5,082,890 | A | 1/1992 | Chou et al. |
| 5,089,553 | A | 2/1992 | Umeda et al. |
| 5,114,995 | A | 5/1992 | Golder et al. |
| 5,114,996 | A | 5/1992 | Golder et al. |
| 5,114,997 | A | 5/1992 | Golder et al. |
| 5,114,998 | A | 5/1992 | Golder et al. |
| 5,147,920 | A | 9/1992 | Dekkers et al. |
| 5,155,145 | A | 10/1992 | Foster et al. |
| 5,189,091 | A | 2/1993 | Laughner |
| 5,240,980 | A | 8/1993 | Danielson et al. |
| 5,258,161 | A | 11/1993 | Ealer |
| 5,262,471 | A | 11/1993 | Akao |
| 5,288,784 | A | 2/1994 | Minayoshi |
| 5,300,558 | A | 4/1994 | Kurisu et al. |
| 5,308,892 | A | 5/1994 | Zickler et al. |
| 5,316,714 | A | 5/1994 | Yoneda et al. |
| 5,322,663 | A | 6/1994 | Lai et al. |
| 5,326,806 | A | 7/1994 | Yokoshima et al. |
| 5,360,829 | A | 11/1994 | Kawabe et al. |
| 5,369,154 | A | 11/1994 | Laughner |
| 5,373,046 | A | 12/1994 | Okamura et al. |
| 5,376,702 | A | 12/1994 | Stibal et al. |
| 5,391,607 | A | 2/1995 | Fujii et al. |
| 5,399,603 | A | 3/1995 | Sloan et al. |
| 5,449,722 | A | 9/1995 | Nishida et al. |
| 5,461,092 | A | 10/1995 | Laughner |
| 5,489,640 | A | 2/1996 | Riding |
| 5,496,880 | A | 3/1996 | Heuseveldt et al. |
| 5,504,130 | A | 4/1996 | Riding |
| 5,523,379 | A | 6/1996 | Rosenquist |
| 5,536,763 | A | 7/1996 | Foran |
| 5,571,866 | A | 11/1996 | Nishida et al. |
| 5,574,078 | A | 11/1996 | Elwakil |
| 5,635,548 | A | 6/1997 | Kittle et al. |
| 5,654,347 | A | 8/1997 | Khemani et al. |
| 5,656,700 | A | 8/1997 | Kagi et al. |
| 5,712,362 | A | 1/1998 | Scholl et al. |
| 5,807,963 | A | 9/1998 | Rosenquist |
| 5,830,544 | A | 11/1998 | Kerscher et al. |
| 5,831,544 | A | 11/1998 | Park |
| 5,834,089 | A | 11/1998 | Jones et al. |
| 5,840,419 | A | 11/1998 | Alder |
| 5,874,517 | A | 2/1999 | Huang et al. |
| 5,898,058 | A | 4/1999 | Nichols et al. |
| 5,900,487 | A | 5/1999 | Rosenquist |
| 5,908,890 | A | 6/1999 | Cornett |
| 5,919,872 | A | 7/1999 | Tung et al. |
| 5,919,891 | A | 7/1999 | Rosenquist |
| 5,922,828 | A | 7/1999 | Schiraldi |
| 5,939,516 | A | 8/1999 | Greaves et al. |
| 5,945,460 | A | 8/1999 | Ekart et al. |
| 5,962,558 | A | 10/1999 | Rosenquist |
| 5,976,450 | A | 11/1999 | Mreijen |
| 6,020,414 | A | 2/2000 | Nelsen et al. |
| 6,048,922 | A | 4/2000 | Brink et al. |
| 6,099,789 | A | 8/2000 | Sumi |
| 6,110,405 | A | 8/2000 | King et al. |
| 6,121,351 | A | 9/2000 | Weaver et al. |
| 6,147,148 | A | 11/2000 | Tanaka et al. |
| 6,150,454 | A | 11/2000 | Wu et al. |
| 6,150,496 | A | 11/2000 | Ilg et al. |
| 6,201,041 | B1 | 3/2001 | Pasbrig et al. |
| 6,277,899 | B1 | 8/2001 | Bastioli et al. |
| 6,281,283 | B1 | 8/2001 | Heitz et al. |
| 6,284,866 | B1 | 9/2001 | Schiavone |
| 6,294,254 | B1 | 9/2001 | Nichols et al. |
| 6,306,492 | B1 | 10/2001 | Yamada et al. |
| 6,323,271 | B1 | 11/2001 | Caldwell et al. |
| 6,335,422 | B2 | 1/2002 | Schiavone |
| 6,339,121 | B1 | 1/2002 | Rafailovich et al. |
| 6,359,052 | B1 | 3/2002 | Trexler, Jr. et al. |
| 6,362,269 | B1 | 3/2002 | Ishihata et al. |
| 6,383,635 | B1 | 5/2002 | King et al. |
| 6,423,764 | B1 | 7/2002 | Zhao et al. |
| 6,485,829 | B2 | 11/2002 | Nichols et al. |
| 6,500,890 | B2 | 12/2002 | Edwards et al. |
| 6,503,616 | B1 | 1/2003 | Jalan |
| 6,559,271 | B2 | 5/2003 | Schaaf et al. |
| 6,569,991 | B2 | 5/2003 | Nichols et al. |
| 6,573,359 | B2 | 6/2003 | Nichols et al. |
| 6,590,069 | B2 | 7/2003 | Nichols et al. |
| 6,599,596 | B2 | 7/2003 | Nichols et al. |
| 6,710,158 | B2 | 3/2004 | Edwards et al. |
| 6,727,306 | B2 | 4/2004 | Edwards et al. |
| 6,767,485 | B1 | 7/2004 | Steiner |
| 6,803,082 | B2 | 10/2004 | Nichols et al. |
| 7,294,671 | B2 | 11/2007 | Bheda et al. |
| 2001/0029281 | A1 | 10/2001 | Nichols et al. |
| 2002/0077405 | A1* | 6/2002 | Edwards et al. ............ 524/425 |
| 2003/0022989 | A1* | 1/2003 | Braig et al. ................ 525/67 |
| 2003/0039783 | A1 | 2/2003 | Stafford et al. |
| 2003/0055207 | A1 | 3/2003 | Xu et al. |
| 2004/0236066 | A1 | 11/2004 | Moore et al. |
| 2005/0170175 | A1 | 8/2005 | Nichols et al. |
| 2005/0176881 | A1 | 8/2005 | Bheda et al. |
| 2007/0142537 | A1 | 6/2007 | Edwards et al. |
| 2008/0226856 | A1 | 9/2008 | Edwards et al. |

FOREIGN PATENT DOCUMENTS

| | | | |
|---|---|---|---|
| CZ | 177211 B1 | | 2/1979 |
| EP | 0060178 | | 9/1982 |
| EP | 0139203 | | 5/1985 |
| EP | 139203 | * | 5/1985 |
| EP | 0169085 A1 | | 1/1986 |
| EP | 00258636 | | 3/1988 |
| EP | 0266754 | | 5/1988 |
| EP | 0272417 A2 | | 6/1988 |
| EP | 0455370 A2 | | 11/1991 |
| EP | 0459317 | | 12/1991 |
| EP | 459317 | * | 12/1991 |
| EP | 678376 A1 | | 10/1995 |
| EP | 0703263 A1 | | 3/1996 |
| EP | 0718341 A2 | | 6/1996 |
| EP | 0794222 | | 9/1997 |
| EP | 878502 A2 | | 11/1998 |
| EP | 1349884 | | 8/2004 |
| EP | 1341836 | | 3/2005 |
| GB | 1104089 | | 8/1966 |
| GB | 1100175 | | 1/1968 |
| IE | 52386 | | 10/1987 |
| JP | 45-19789 | | 7/1970 |
| JP | 48-79896 | | 10/1973 |
| JP | 61-031429 | | 2/1986 |
| JP | 61-250034 | | 11/1986 |
| JP | 10-6387 | | 1/1988 |
| JP | 2-147657 | | 6/1990 |
| JP | 2307117 | | 12/1990 |

| | | | |
|---|---|---|---|
| JP | 03039348 A | | 2/1991 |
| JP | 4-180957 | | 6/1992 |
| JP | 4-183716 | | 6/1992 |
| JP | 4-183718 | | 6/1992 |
| JP | 04180957 | * | 6/1992 |
| JP | 5-104621 | | 4/1993 |
| JP | 05-117379 | | 5/1993 |
| JP | 5-214161 | | 8/1993 |
| JP | 6065478 | | 3/1994 |
| JP | 06073205 | | 3/1994 |
| JP | 7-238211 | | 9/1995 |
| JP | 08120066 A | | 5/1996 |
| JP | 9-272191 | | 10/1997 |
| JP | 11323126 A | | 11/1999 |
| JP | 319365 | | 11/2000 |
| WO | WO 88/01503 | | 3/1988 |
| WO | WO 93/20147 | | 10/1993 |
| WO | WO 99/28408 | | 6/1999 |
| WO | WO 99/41297 A | | 8/1999 |
| WO | WO 00/12793 A | | 3/2000 |
| WO | WO 00/52094 | | 8/2000 |
| WO | WO 00/66659 A | | 11/2000 |
| WO | WO 01/34703 | | 5/2001 |
| WO | WO 02/16464 A2 | | 2/2002 |
| WO | WO 02/48237 | | 6/2002 |
| WO | WO 02/48262 | | 6/2002 |
| WO | WO 02/051616 | | 7/2002 |
| WO | WO 02/051616 A2 | | 7/2002 |
| WO | WO 02/079309 | | 10/2002 |

OTHER PUBLICATIONS

Opposition Brief filed in the European Patent Office in European Patent Office by Eastman Chemical Co. on Dec. 8, 2005 against European Patent No. 1341836
Opposition Brief filed in the European Patent Office by Ciba Speciality Chemical on May 23, 2005 against European Patent No. 1349884. (English translation is included.)
Opposition Brief filed in the European Patent Office by Eastman Chemical Co. on May 25, 2005 against European Patent No. 1349884.
Ciba Specialty Chemicals Inc., Ciba® TINUVIN® 213 Liquid Benzotriazole UV Absorber, Printing date Oct. 2004.
Observations on Behalf of the Patentee filed on Dec. 6, 2004 in support of European Patent No. 0 900 247.
Opposition Brief filed in the European Patent Office on Jun. 23, 2004, by Eastman Chemical Co. against European Patent EP 0 900 247, which issued Sep. 24, 2003, to Wellman, Inc.
G.M. Terekhova, N.V. Mikhailov, L.G. Tokareva; Heat Stability of Polyethylene Terephthalate (PET) Containing Phosphoric Acid Esters; Khimicheskie Volokna, No. 4, 1964 pp. 33-35.
English Translation of Opposition Brief filed in the EPO by Ciba Speciality Chemical on Dec. 8, 2005 against European Patent No. 1341836.
Wellman's Observation on Behalf of the Patentee in the Matter of European Patent No. 1349884 and in the matter of Opposition thereto by Eastman and by Ciba Spec. Chemical. (Jul. 2006).
English translation of an official letter received from the Mexican Institute of Industrial Property, related to a Mexican Patent Application No. PA/a/2003/005346, dated Dec. 22, 2005.
Responsive comments filed in the European Patent Office on May 5, 2006, by Eastman Chemical Co. against European Patent EP 1 349 884, which issued Aug. 25, 2004, to Wellman, Inc.
W.R. Sorenson & T.W. Campbell. "Preparative methods of Polymer Chemistry," Interscience Publishers, New York, 1968, pp. 130-154.
Encyclopedia of Polymer Science and Engineering, 2nd Ed., H.F. Mark et al., (John Wiley & Sons, New York 1985) vol. 12, pp. 259-274.
Wellman's Observation on Behalf of the Pantentee in the Matter of European Patent No. 1341836 and in the Matter of Opposition thereto by Eastman and by Ciba Spec. Chemical; Filed Jul. 24, 2006.
International Search Report (mailed Jun. 6, 2002), Written Opinion (mailed Sep. 10, 2002), Written Opinion (mailed Mar. 10, 2003), and International Preliminary Examination Report (mailed Apr. 14, 2003) for International Application No. PCT/US01/48423.
International Search Report (mailed Jun. 14, 2002), Written Opinion (mailed Aug. 7, 2002), Written Opinion (mailed Mar. 10, 2003), and International Preliminary Examination Report (mailed Apr. 30, 2003) and International Preliminary Examination Report (mailed Jun. 16, 2003) for International Application No. PCT/US01/48440.
International Search Report (mailed Aug. 9, 2002), Written Opinion (mailed Nov. 21, 2002),and International Preliminary Examination Report (mailed Apr. 17, 2003) for International Application No. PCT/US01/48659.
Opposition Brief filed in the European Patent Office by Ciba Speciality Ckemical on Dec. 8, 2005, against European Patent No. 1341836.
File History of Interference Proceeding before the U.S. Board of Patent Appeals and Interferences, Interference No. 105321, distributed on Oct. 18, 2006.
International Search Report in commonly owned International Application No. PCT/US01/48659, mailed on Aug. 9, 2002.
International Written Opinion in commonly owned International Application No. PCT/US01/48659, mailed on Nov. 21, 2002.
International Preliminary Examination Report in commonly owned International Application No. PCT/US01/48659, mailed on Apr. 17, 2003.
CIBA-GEIGY, Tinuvin 213, Ultraviolet Light Stablizer, Product Data, Hawthorne NY (1990).
European Office Action for counterpart European Application No. 01992116, dated Jan. 9, 2004.
Wellman's Observations to the Oral Proceedings in the matter of European Patent No. 1349884, dated Sep. 7, 2007.
Decision revoking European Patent No. 1349884, issued by the European Patent Office on Nov. 20, 2007.
Minutes of the oral proceedings before the European Patent (Opposition Division) for European Patent No. 1349884, dated Nov. 20, 2007.
Eastman Chemical Company Observations to the Oral Proceedings in the matter of European Patent No. 1341836, dated Nov. 29, 2007.
Wellman's Observations to the Oral Proceedings in the matter of European Patent No. 1341836, dated Nov. 29, 2007.
Canadian Office Action in Canadian Application No. 2,431,823, dated Jan. 10, 2008.
Canadian Office Action in counterpart Canadian Application No. 2,431,637, dated Jan. 11, 2008.
Notice of Appeal filed by Wellman against the decision to revoke European Patent No. 1349884, dated Jan. 28, 2008.
Minutes of the oral proceedings before the European Patent Office (Opposition Division) for European Patent No. 1341836, dated Jan. 30, 2008.
Decision revoking European Patent No. 1341836, issued by the European Patent Office on Apr. 3, 2008.
Canadian Office Action in commonly owned copending Canadian Application No. 2431823, dated Jan. 10, 2008, Counterpart of International Publication No. WO 02/051616.
Canadian Office Action in counterpart Canadian Application No. 2431637, dated Jan. 11, 2008, Counterpart of International Publication No. WO 02/048237.
English translation of Taiwanese Office Action in commonly owned copending Taiwanese Application No. 091112797, Counterpart of International Publication No. WO 02/051616, tranmitted to Applicants on Mar. 23, 2008.
BASF Corporation, Polyethylene Glycols, General Information, Printing date Oct. 17, 2002.
English translation of Taiwanese Office Action in commonly owned copending Taiwanese Application No. 090131091, Counterpart of International Publication No. WO 02/048237, transmitted to Applicants on Jan. 24, 2003.
English translation of Taiwanese Office Action in commonly owned copending Taiwanese Application No. 091113492, Counterpart of U.S. Patent No. 6,573,359, issued on Jul. 4, 2005.
European Office Action in counterpart European Patent No. 1341836, dated Jan. 9, 2004.
Decision to grant European Patent No. 1341836, issued by the European Patent Office on Aug. 20, 2004.

Minutes of oral proceedings before the European Patent Office (Opposition Division) for European Patent No. 1349884, dated Nov. 7, 2007.

Decision revoking European Patent No. 1349884, issued by the European Patent Office on Nov. 20, 2007.

Letter from opponent Ciba in European Patent No. 1349884, dated Aug. 20, 2007.

Summons to Oral Proceedings in European opposition proceeding against European Patent No. 1349884, dated Sep. 7, 2007.

Summons to Oral Proceedings in European opposition proceeding against European Patent No. 1341836, dated Nov. 29, 2007.

Statement of Grounds for Appeal in counterpart European Patent Application No. 01992116, filed on Jul. 25, 2008.

Letter from opponent Eastman Chemical Co., in opposition proceedings against European Patent No. 1341836, dated Feb. 23, 2009.

Letter from opponent Ciba in opposition proceedings (German-language) against European Patent No. 1341836, dated Feb. 16, 2009.

Eastman Chemical Company's Reply to Wellman's Statement of Grounds for Appeal in the matter of European Patent No. 1341836, dated Feb. 23, 2009.

Ciba's Reply to Wellman's Statement of Grounds for Appeal in the matter of European Patent No. 1341836, dated Feb. 16, 2009.

Canadian Notice of Allowance in Canadian Patent Application No. 2,431,637, dated Jun. 19, 2009.

Wellman's Notice of Appeal against the decision of the Opposition Division revoking European Patent No. 1341836, dated May 30, 2008.

Decision confirming revocation of European Patent No. 1349884 for failure to file a Statement of Grounds, dated Dec. 5, 2008.

* cited by examiner

POLYESTER RESINS AND POLYESTER CONTAINERS HAVING REDUCED FRICTIONAL PROPERTIES

CROSS-REFERENCE TO RELATED PATENTS

This application is a voluntary division (i.e., a continuing application) of commonly-assigned U.S. application Ser. No. 11/670,644 for Methods for Making Polyester Resins Having Reduced Frictional Properties, which was filed Feb. 2, 2007, and published Jun. 21, 2007, as U.S. Patent Application Publication No. 2007/0142537 A1, now abandoned, which is a voluntary division (i.e., a continuing application) of commonly-assigned U.S. application Ser. No. 10/962,167 for Methods for Introducing Additives into Polyethylene Terephthalate, which was filed Oct. 8, 2004, and published Aug. 4, 2005, as U.S. Patent Application Publication No. 2005/0170175 A1, which is a continuation-in-part of commonly-assigned U.S. application Ser. No. 10/628,077, now U.S. Pat. No. 6,803,082, for Methods for the Late Introduction of Additives into Polyethylene Terephthalate, which was filed Jul. 25, 2003, and which is a continuation of commonly-assigned U.S. application Ser. No. 09/738,150, now U.S. Pat. No. 6,599,596, for Methods of Post-Polymerization Injection in Continuous Polyethylene Terephthalate Production, which was filed Dec. 15, 2000.

U.S. application Ser. No. 11/670,644, now abandoned, (and its corresponding U.S. Patent Application Publication No. 2007/0142537 A1), U.S. application Ser. No. 10/962,167 (and its corresponding U.S. Patent Application Publication No. 2005/0170175 A1), U.S. Pat. No. 6,803,082, and U.S. Pat. No. 6,599,596 are herein incorporated by reference in their entirety.

This application, like its parent applications, incorporates entirely by reference commonly-assigned application Ser. No. 09/738,619, now U.S. Pat. No. 6,500,890, for Polyester Bottle Resins Having Reduced Frictional Properties and Methods for Making the Same. This application includes material disclosed in commonly-assigned U.S. Pat. No. 6,500,890 but does not introduce new matter into the present invention disclosure.

This application further incorporates entirely by reference the following commonly-assigned patents: Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/176,737 for Polymer Resins Having Reduced Frictional Properties, filed Jun. 21, 2002, now U.S. Pat. No. 6,727,306; and Ser. No. 10/177,932 for Methods for Making Polyester Bottle Resins Having Reduced Frictional Properties, filed Jun. 21, 2002, now U.S. Pat. No. 6,710,158.

FIELD OF THE INVENTION

The invention relates to polyester resins that include small amounts of inert particulate additives, which reduce the coefficient of friction in bottles formed from the polyester resins while maintaining bottle clarity.

The invention further relates to the late introduction of additives, such as inert particulates, via reactive carriers during polyethylene terephthalate production.

BACKGROUND OF THE INVENTION

Polyester resins, especially polyethylene terephthalate (PET) and its copolyesters, are widely used to produce rigid packaging, such as two-liter soft drink containers. Polyester packages produced by stretch-blow molding possess high strength and shatter resistance, and have excellent gas barrier and organoleptic properties as well. Consequently, such plastics have virtually replaced glass in packaging numerous consumer products (e.g., carbonated soft drinks, fruit juices, and peanut butter).

In conventional techniques of making bottle resin, modified polyethylene terephthalate is polymerized in the melt phase to an intrinsic viscosity of about 0.6 deciliters per gram (dl/g), whereupon it is polymerized in the solid phase to achieve an intrinsic viscosity that better promotes bottle formation. Before 1965, the only feasible method of producing polyethylene terephthalate polyester was to use dimethyl terephthalate (DMT). In this technique, dimethyl terephthalate and ethylene glycol are reacted in a catalyzed ester interchange reaction to form bis(2-hydroxyethyl)terephthalate monomers and oligomers, as well as a methanol byproduct that is continuously removed. These bis(2-hydroxyethyl) terephthalate monomers and oligomers are then catalytically polymerized via polycondensation to produce polyethylene terephthalate polymers.

Purer forms of terephthalic acid (TA) are now increasingly available. Consequently, terephthalic acid has become an acceptable, if not preferred, alternative to dimethyl terephthalate as a starting material for the production of polyethylene terephthalate. In this alternative technique, terephthalic acid and ethylene glycol react in a generally uncatalyzed esterification reaction to yield low molecular weight monomers and oligomers, as well as a water byproduct that is continuously removed. As with the dimethyl terephthalate technique, the monomers and oligomers are subsequently catalytically polymerized by polycondensation to form polyethylene terephthalate polyester. The resulting polyethylene terephthalate polymer is substantially identical to the polyethylene terephthalate polymer resulting from dimethyl terephthalate, albeit with some end group differences.

Polyethylene terephthalate polyester may be produced in a batch process, where the product of the ester interchange or esterification reaction is formed in one vessel and then transferred to a second vessel for polymerization. Generally, the second vessel is agitated and the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reactions, and then the polymerization reaction as a continuous process. The continuous production of polyethylene terephthalate results in greater throughput, and so is more typical in large-scale manufacturing facilities.

When the polymerization process is complete, the resulting polymer melt is typically extruded and pelletized for convenient storage and transportation. Thereafter, the polyethylene terephthalate may be molded into preforms and bottles.

As will be understood by those having ordinary skill in the art, polyethylene terephthalate is typically converted into a container via a two-step process. First, an amorphous bottle preform is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature. The reheated preform is then placed into a bottle mold and, by stretching and inflating with high-pressure air, formed into a bottle. Those of ordinary skill in the art will understand that any defect in the preform is typically transferred to the bottle. Accordingly, the quality of the bottle resin used to form injection-molded preforms is critical to achieving commercially acceptable bottles.

Polyethylene terephthalate bottles, especially straight-walled two-liter soft drink bottles, often possess high coefficients of friction (COF). This is a significant problem in the bottling industry as excessive friction between adjacent bottles prevents such bottles from easily and efficiently sliding past one another as they are depalletized. To improve depalletizing, bottlers conventionally resort to water misting and line lubrication on a filling line.

There is a need for a polyester bottle that possesses reduced coefficient of friction while retaining bottle clarity and, therefore, a corresponding need for a method to achieve the same.

OBJECT AND SUMMARY OF THE INVENTION

Accordingly, it is an object of the present invention to provide a method of adding additives via a reactive carrier to a continuous polyethylene terephthalate process after the melt-phase polycondensation reactions are essentially complete.

It is a further object of the present invention to provide a method of adding additives in a reactive carrier to a continuous polyethylene terephthalate process to reduce polymer transition times and eliminate upsets to the continuous process resulting from changing polymer formulations.

It is a further object of the present invention to provide a method of introducing additives into a continuous polyethylene terephthalate process in a way that reduces the degradation or volatilization of such additives.

It is a further object of the present invention to provide a simplified additive delivery system wherein the reactive carrier is a pumpable liquid or slurry at or near room temperature.

It is a further object of the present invention to provide a simplified additive delivery system that does not require the use of an extruder to deliver additives.

It is a further object of the present invention to provide a method for making polyethylene terephthalate resin that can be formed into high-clarity bottles possessing reduced coefficient of friction.

It is a further object of the present invention to provide a method for making polyethylene terephthalate preforms and bottles possessing reduced coefficients of friction.

It is a further object of the present invention to provide a polyester resin that is capable of being formed into high-clarity bottles possessing reduced coefficient of friction.

It is a further object of the present invention to provide a high-clarity polyester bottle including a surface-modified talc or surface-modified calcium carbonate in concentrations that permit the bottle to possess reduced coefficient of friction.

The foregoing, as well as other objectives and advantages of the invention and the manner in which the same are accomplished, is further specified within the following detailed description and its accompanying drawings.

DETAILED DESCRIPTION

In one aspect, the invention is a novel method for the late introduction of additives into a continuous process for making polyethylene terephthalate. The additives are introduced during, and preferably after, the polycondensation of polyethylene terephthalate polymers. In particular, the method employs a reactive carrier that not only functions as a delivery vehicle for one or more additives, but also reacts with the polyethylene terephthalate, thereby binding the carrier in the polyethylene terephthalate resin. This prevents the emergence of the carrier from the polyethylene terephthalate during subsequent processing, such as solid state polymerization and injection molding operations. This also improves dispersion of the additive in the polymer and reduces the tendency of the additive to emerge and deposit in polymer processing equipment during solid state polymerization.

In one embodiment, the invention is a method for making a polyester resin that can be formed into high-clarity bottles possessing reduced coefficient of friction. The method generally includes reacting a terephthalate component and a diol component to form polyethylene terephthalate precursors (e.g., bis(2-hydroxyethyl)terephthalate), which are then polymerized via melt phase polycondensation to form polymers of polyethylene terephthalate of a desired molecular weight. During polycondensation, which is usually enhanced by catalysts, ethylene glycol is continuously removed to create favorable reaction kinetics.

Thereafter, inert particulate additives are introduced by way of a reactive carrier into the polyethylene terephthalate polymers (i.e., the reactive carrier functions as an additive delivery vehicle). The reactive carrier, which has a molecular weight of less than about 10,000 g/mol, not only facilitates uniform blending of the inert particulate additives within the polymer melt, but also reacts with the polyethylene terephthalate polymers to ensure that the carrier does not emerge during subsequent processes.

In another embodiment, the invention includes polymerizing the polyethylene terephthalate precursors via melt phase polycondensation to form polyethylene terephthalate polymers having a target intrinsic viscosity of at least about 0.45 dl/g. Once the polyethylene terephthalate polymers have achieved this target intrinsic viscosity, inert particulate additives are introduced by way of a reactive carrier having a molecular weight of less than about 10,000 g/mol. Finally, the melt phase polycondensation of the polyethylene terephthalate polymers is completed. Where inert particulate additives are introduced during the polycondensation of polyethylene terephthalate polymers, the target intrinsic viscosity is preferably at least about 0.50 dl/g, more preferably at least about 0.55 dl/g, and most preferably at least about 0.60 dl/g. At an intrinsic viscosity of at least about 0.45 dl/g, the polyethylene terephthalate polymer possesses sufficient molecular weight, mechanical properties, melt strength, and crystallinity to facilitate polymer processing.

The embodiments of the present invention as herein disclosed are applicable regardless of whether the late addition of inert particulate additives occurs after the polycondensation stage or during the polycondensation stage (i.e., where the target intrinsic viscosity of the polyethylene terephthalate polymers is at least about 0.45 dl/g).

Accordingly, in a particular embodiment, the method is characterized by the introduction of between about 20 and 200 ppm of an inert particulate additive (e.g., talc or calcium carbonate) that is capable of reducing the coefficient of friction in bottles formed from the polyethylene terephthalate polymers. The friction-reducing additive has an average particle size of less than about ten microns and is preferably either surface-modified talc or surface-modified calcium carbonate.

In another aspect, the invention is a polyester resin that is capable of being formed into low-haze, high-clarity bottles possessing reduced coefficient of friction. The bottle resin is characterized by the inclusion of between about 20 and 200 ppm of an inert particulate additive, preferably either talc (i.e., a natural hydrous magnesium silicate of representative formula $3MgO.4SiO_2.H_2O$) or precipitated calcium carbonate, having an average particle size of less than about ten microns, more preferably less than two microns. The inert particulate additive, which is preferably surface-treated, is present in low concentrations to ensure that bottles formed from the polyester bottle resin possess low haziness. Such improved frictional characteristics reduce, and can eliminate, the need to apply, during filling operation, external lubricants to the surfaces of containers formed from the present polyester resin.

Preferably, the polyester resin includes between about 40 and 150 ppm of the inert particulate additive, more preferably between about 40 and 100 ppm of the inert particulate additive, and most preferably between about 60 and 100 ppm of the inert particulate additive.

Without being bound to a particular theory, it is believed that the introduction of fillers can create discontinuous phases within the polyethylene terephthalate resin. During stretch-blow molding, such discontinuities lead to the formation of microvoids around the filler particles. This causes bottle haze because of differences in refractive index between the microvoid regions and the polyethylene terephthalate matrix. The microvoids are apparently caused by an inherent incompatibility of the filler particles with the polyethylene terephthalate matrix.

According to the present invention, to improve compatibility between the polyethylene terephthalate polymers and the inert particulate additive, the inert particulate additive is preferably treated with a coupling agent before its addition to polyethylene terephthalate polymers. This has been found to significantly reduce bottle haze while reducing bottle coefficient of friction (COF). Without coupling agent treatment, the polyethylene terephthalate polymers resist wetting of the inert particles. Thus, all things being equal, surface treatment reduces polyester bottle haze.

Accordingly, the inert particulate additive is preferably surface-modified talc or surface-modified calcium carbonate. In particular, talc is preferably surface treated using silanes, especially organosilanes such as 3-aminopropyl trimethoxy silane and 3-aminopropyl triethoxy silane, at a loading of between about 0.5 and one weight percent. Calcium carbonate is preferably surface treated using stearic acid at a loading of between about one and two weight percent. Treatment with these coupling agents (e.g., organosilane and stearic acid) facilitates compatibility between the inert particles and the polyethylene terephthalate polymer by introducing covalent chemical bonding between the particle surface and the polyethylene terephthalate polymer, or by introducing a hydrophobic moiety that is compatible with the polyethylene terephthalate to facilitate better polymer wetting of the particle.

Figure 1:
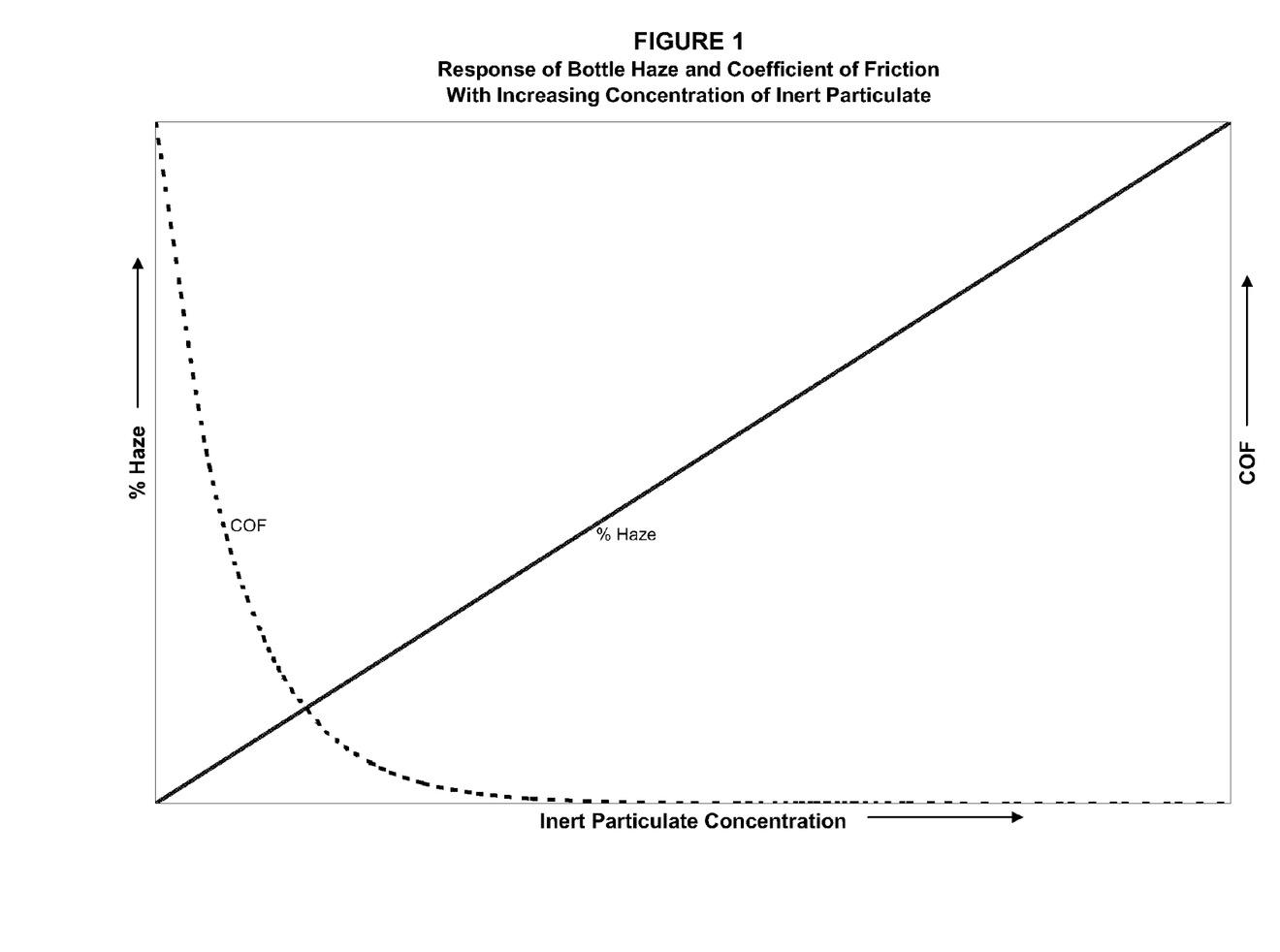
FIG. 1 illustrates the qualitative effect on bottle sidewall haze and friction as a function of increasing concentration of the reduced-COF additive.

The inclusion of an inert particulate additive in the polyethylene terephthalate resin reduces bottle friction, but also increases bottle haze. FIG. 1 depicts the trade-off between reduced friction and haze. In brief, concentrations of talc or calcium carbonate greater than about 200 ppm (and in some instances even 100 ppm) will result in unacceptable hazy bottles, and concentrations of talc or calcium carbonate much less than about 20 ppm will not noticeably reduce bottle coefficient of friction (COF). As described previously, the polyester resin preferably includes between about 40 and 150 ppm of the inert particulate additive and most preferably between about 60 and 100 ppm of the inert particulate additive.

The efficacy of the present invention is demonstrated by testing that shows the addition of 100 ppm of surface-treated talc reduces coefficient of friction by about 90 percent, as measured using ASTM Test method D 1894.

Note that at any given weight fraction of inert particulate additive, increasing particle size will exacerbate haziness with no concomitant reduction in friction. An average particle size of much more than ten microns generally causes unacceptable bottle haze. As will be understood by those familiar with this art, particle size is typically measured by techniques based on light scattering. Particle sizes and distributions are often characterized using a Hegman Fineness number determined from ASTM D1210-79.

As used herein, the term "diol component" refers primarily to ethylene glycol, although other diols (e.g., polyethylene glycol) may be used as well. It will be understood by those of ordinary skill in the art that the diol component usually forms the majority of terminal ends of the polymer chains and so is present in the composition in slightly greater fractions. For example, the molar ratio of the terephthalate component and the diol component is typically between about 1.0:1.0 and 1.0:1.6.

As used herein, the term "terephthalate component" refers to diacids and diesters that can be used to prepare polyethylene terephthalate. In particular, the terephthalate component mostly includes terephthalic acid and dimethyl terephthalate, but can include diacid and diester comonomers as well. In this regard, those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated ester exchange reaction to form monomers and oligomers of terephthalate and ethylene glycol, as well as methanol as a byproduct. To enable the ester exchange reaction to go essentially to completion, the methanol must be continuously removed as it is formed.

It will be understood by those having ordinary skill in the art that the polyethylene terephthalate herein described may be a modified polyethylene terephthalate to the extent the diol component can include other glycols besides ethylene glycol (e.g., diethylene glycol, 1,3-propanediol, 1,4-butanediol and 1,4-cyclohexane dimethanol), or the terephthalate component includes modifiers such as isophthalic acid, 2,6-naphthalene dicarboxylic acid, succinic acid, or one or more functional derivatives of terephthalic acid. In fact, most commercial polyethylene terephthalate polymers are modified polyethylene terephthalate polyesters.

An advantage of the present invention is that the inert particulate additives may be added to any polyester bottle resin formulation to reduce coefficient of friction (COF) in bottles made therefrom. In this regard, bottle grade polyester resins will not be discussed herein in detail as such resins are well known in the art. For example, commonly-assigned, application Ser. No. 09/456,253 filed Dec. 7, 1999, for a Method of Preparing Modified Polyester Bottle Resins, now U.S. Pat. No. 6,284,866, which discusses several U.S. patents that disclose various modified polyethylene terephthalate resins. This application is hereby incorporated entirely herein by reference.

While the present application is directed to polyester resins, it is believed that non-polyester resins, such as high-density polyethylene (HDPE), low-density polyethylene (LDPE), linear low-density polyethylene (LLDPE), polyvinyl chloride (PVC), and polyvinyl dichloride (PVDC), which are typically used in films, show analogous frictional characteristics and thus benefit from the use of inert particulate additives to reduce coefficient of friction (COF).

In the present invention, the direct esterification reaction is preferred over the older, two-step ester exchange reaction. As noted, the direct esterification technique reacts terephthalic acid and ethylene glycol to form low molecular weight monomers, oligomers, and water.

For example, in a typical, exemplary process the continuous feed enters a direct esterification vessel that is operated at a temperature of between about 240° C. and 290° C. and at a pressure of between about 5 and 85 psia for between about one and five hours. The reaction, which is typically uncatalyzed, forms low molecular weight monomers, oligomers, and water. The water is removed as the esterification reaction proceeds to drive a favorable reaction equilibrium.

Thereafter, the low molecular weight monomers and oligomers are polymerized via polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr. The monomers and oligomers polycondense to form polyethylene terephthalate and ethylene glycol.

The ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a flash vessel and each is typically agitated to facilitate the removal of ethylene glycol. The residence time in the polymerization vessels and the feed rate of the ethylene glycol and terephthalic acid into the continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine the feed rate of the reactants and the residence time within the polymerization vessels.

Note that in addition to the formation of polyethylene terephthalate polymers, side reactions occur that produce undesirable by-products. For example, the esterification of ethylene glycol forms diethylene glycol (DEG), which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products.

After the polymer melt exits the polycondensation stage, typically from the high polymerizer, it is generally filtered and extruded, preferably immediately after exiting the polycondensation stage. After extrusion, the polyethylene terephthalate is quenched, preferably by spraying with water or immersing in a water trough, to solidify it. The solidified polyethylene terephthalate polyester is cut into chips or pellets for storage and handling purposes. As used herein, the term "pellets" is used generally to refer to chips, pellets, and the like.

As will be known to those of skill in the art, the pellets formed from the polyethylene terephthalate polymers may be subjected to crystallization followed by solid state polymerization (SSP) to increase the molecular weight of the polyethylene terephthalate resin. (It should be noted that the method of the invention does not adversely affect the SSP rate and often will even increase the SSP rate.) The polyester chips are then re-melted and re-extruded to form bottle preforms, which can thereafter be formed into polyester containers (e.g., beverage bottles). The levels of inert particulate additives (i.e., less than 200 ppm) do not detrimentally affect cycle times during injection molding operations.

The inert particulate additives are typically added after the melt polymerization is complete (i.e., mixed with the molten polymer stream after the final polymerization vessel). Such late addition is desirable, for example, because esterification and polycondensation conditions can cause a calcium carbonate additive to dissolve in the polymer, which destroys its particulate nature. Consequently, calcium carbonate is preferably added to the polyethylene terephthalate polymer before extrusion and pelletization.

Similarly, high polycondensation temperatures can strip coupling agents (e.g., silane surface treatment) from talc. As talc is not susceptible to dissolution in the polymer, its addition is more adaptable than is the addition of calcium carbonate (i.e., talc itself can be added at any point during the polymerization).

A particular advantage of the present invention is the reduction of polymer transition times and elimination of upsets to continuous processes that result from polymer formulation changes. As will be known by those familiar with the art, conventional polyester processing introduces additives in an ethylene glycol solution or slurry. These ethylene glycol streams are added into the esterification process or the first polycondensation vessel, each of which have a high ethylene glycol content. To effect a product change, the contents of each subsequent vessel must be completely replaced.

In standard continuous units, the required transition time is on the order of four to eight hours.

Although the prior discussion assumes a continuous production process, it will be understood that the invention is not so limited. The teachings disclosed herein may be applied to semi-continuous processes and even batch processes.

In a preferred embodiment, the method introduces the inert particulate additive via a reactive carrier, rather than via an inert carrier or no carrier at all. The reactive carrier, which preferably has a molecular weight of less than about 10,000 g/mol may be introduced during polycondensation, or more preferably, after the polycondensation is complete. In either respect, the reactive carrier should be introduced to the polyethylene terephthalate polymers in quantities such that bulk polymer properties are not significantly affected.

Most preferably, the reactive carrier has a melting point that ensures that it is a liquid or slurry at near ambient temperatures. Near ambient temperatures not only simplify the unit operations (e.g., extruders, heaters, and piping), but also minimize degradation of the inert particulate additives. As used herein, the term "near ambient" includes temperatures between about 20° C. and 60° C.

As a general matter, the reactive carrier should make up no more than about one weight percent of the polyethylene terephthalate resin. Preferably, the reactive carrier is introduced to the polyethylene terephthalate polymers in quantities such that its concentration in the polymer resin is less than about 1000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers.

In yet another embodiment, the reactive carrier may include esters without terminal functional groups, amides without terminal functional groups, or anhydrides without terminal functional groups that are capable of reacting into the polyethylene terephthalate polymers during solid state polymerization and that will not cause the polyethylene terephthalate polymers to suffer intrinsic viscosity loss during injection molding processes.

In view of the foregoing, a preferred embodiment of the invention includes reacting terephthalic acid and ethylene glycol in a heated esterification reaction to form monomers and oligomers of terephthalic acid and ethylene glycol, then polymerizing these monomers and oligomers via melt phase polycondensation to form polyethylene terephthalate polymers. Thereafter, between about 20 and 200 ppm of either surface-modified talc or surface-modified calcium carbonate is introduced into the polyethylene terephthalate polymers using a reactive carrier, which facilitates uniform blending within the polymer melt. Preferably, the reactive carrier is a polyol (e.g., polyethylene glycol) having a molecular weight that permits the polyol to be pumped at near ambient temperatures (e.g., less than 60° C.) and that is introduced to the polyethylene terephthalate polymers in quantities such that bulk properties of the polyethylene terephthalate polymers are not significantly affected. The polyethylene terephthalate polymers are then formed into chips (or pellets via a polymer cutter) before being solid state polymerized. Importantly, the polyol reactive carrier combines with the polyethylene terephthalate polymer such that it is non-extractable during subsequent processing operations (e.g., forming polyester preforms or beverage containers).

As will be understood by those of ordinary skill in the art, macromolecules are considered to be polymers at an intrinsic viscosity of about 0.45 dl/g. This roughly translates to a molecular weight of at least about 13,000 g/mol. In contrast, the reactive carriers according to the present invention have molecular weights that are less than about 10,000 g/mol. The molecular weight of the reactive carrier is typically less than 6,000 g/mol, preferably less than 4,000 g/mol, more preferably between about 300 and 2,000 g/mol, and most preferably between about 400 and 1,000 g/mol. As used herein, molecular weight refers to number-average molecular weight, rather than weight-average molecular weight.

Figure 2:
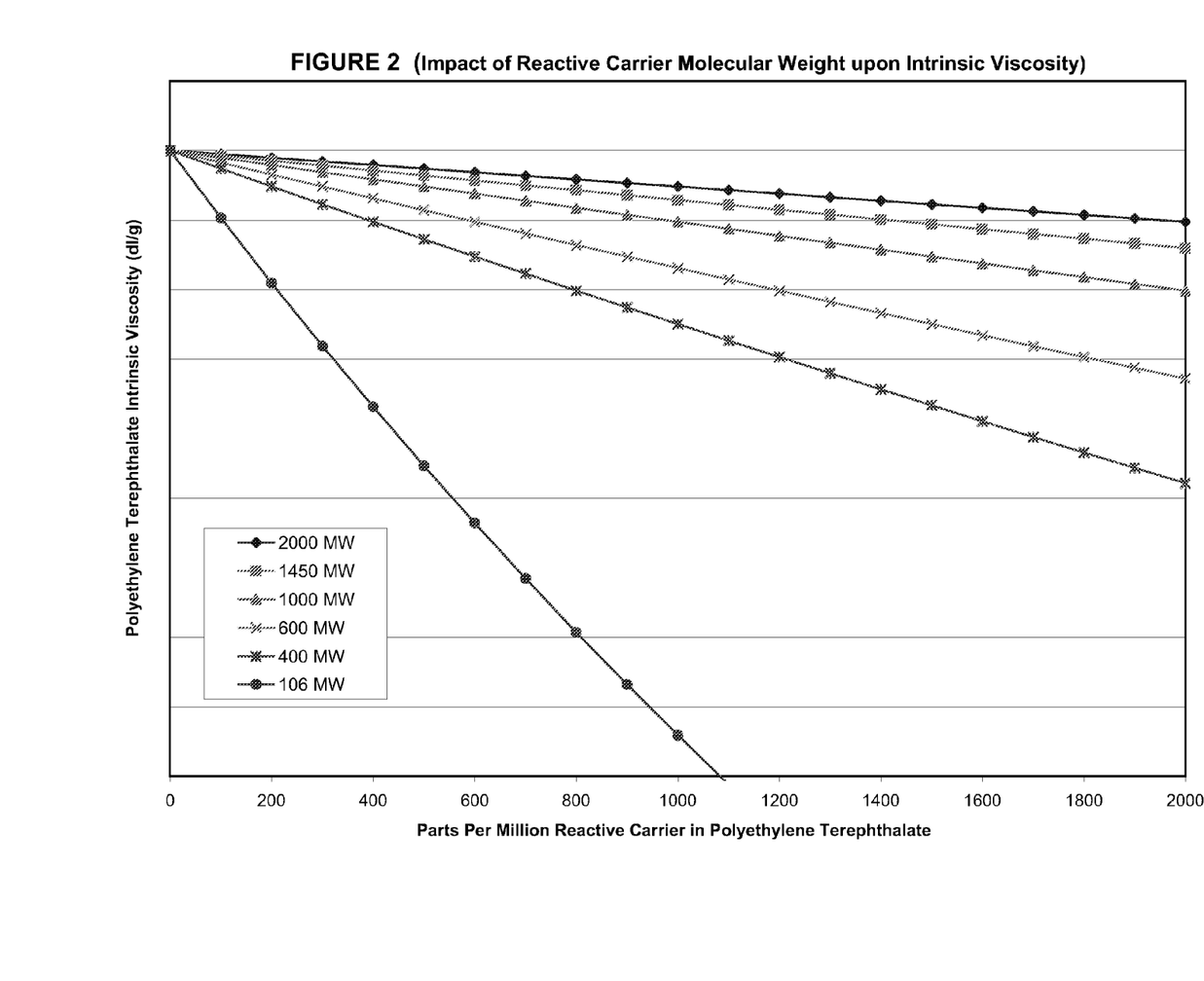
FIGS. 2 and 3 illustrate the theoretical loss of intrinsic viscosity of polyethylene terephthalate as a function of the concentration of a reactive (additive) carrier at various molecular weights.
Figure 3:
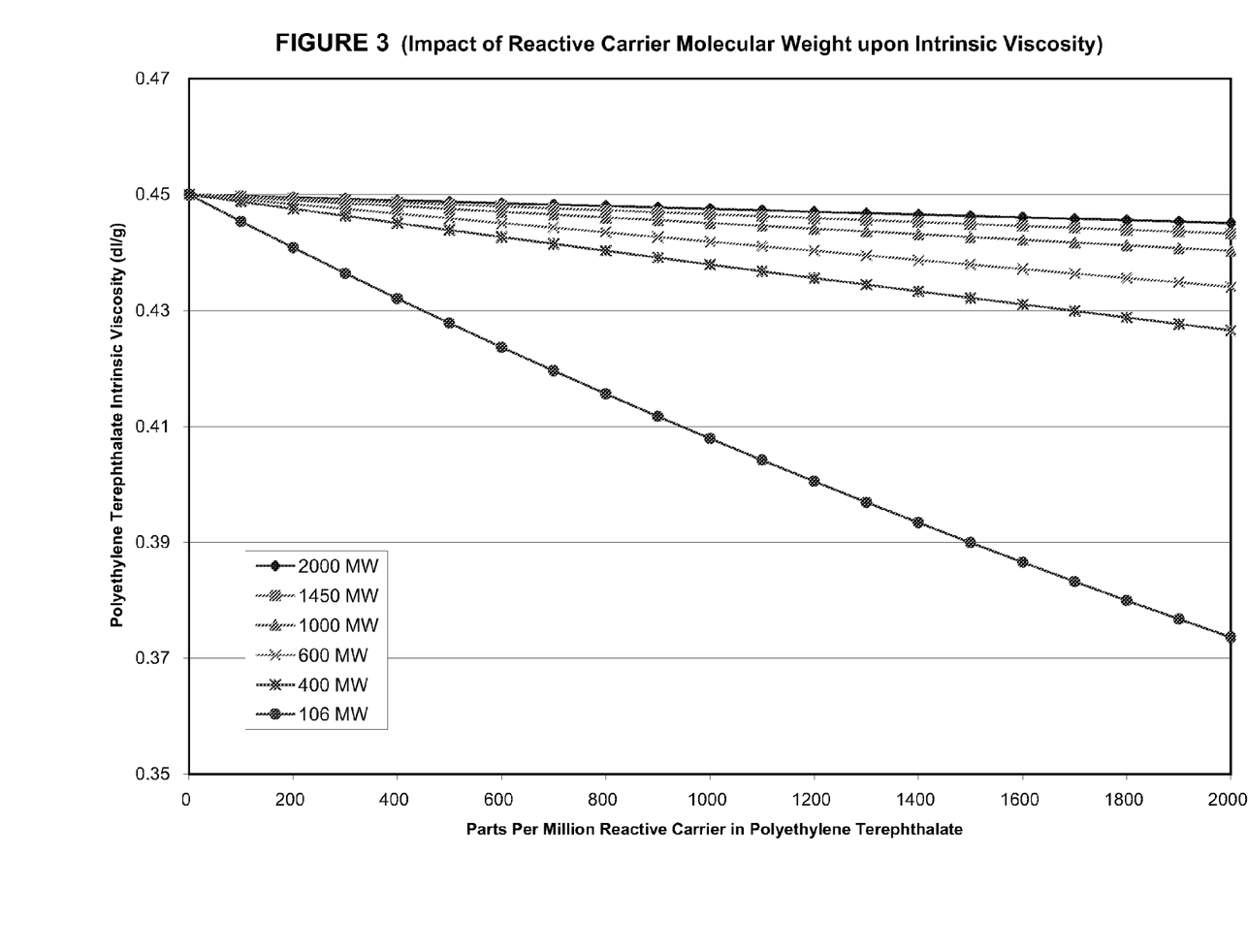

FIGS. 2 and 3 illustrate the theoretical loss of intrinsic viscosity as a function of reactive carrier concentration at several molecular weights. FIG. 2 depicts the impact of the reactive carrier upon polyethylene terephthalate having an intrinsic viscosity of 0.63 dl/g. Similarly, FIG. 3 depicts the impact of the reactive carrier upon polyethylene terephthalate having intrinsic viscosity of 0.45 dl/g. Note that at any concentration, the reactive carriers having higher molecular weights have less adverse effect upon intrinsic viscosity of the polymer resin.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7th Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0-63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

As noted, the invention embraces the late addition of various kinds of additives via the reactive carrier. Late addition is especially desirable where the additives are volatile or subject to thermal degradation. Conventional additive injection during the esterification stage or early during the polycondensation stage subjects additives to several hours of high-temperature (greater than 260° C.) and reduced-pressure (less than 10 torr) conditions. Consequently, additives that have significant vapor pressure at these conditions will be lost from the process. Advantageously, the method of the present invention significantly reduces the time additives are exposed to high polycondensation temperatures.

In addition to inert particulates (e.g., talc, calcium carbonate, clays, or silicas), additives according to the present invention can include, preform heat-up rate enhancers, stabilizers, colorants, antioxidants, branching agents, oxygen barrier agents, carbon dioxide barrier agents, oxygen scavengers, crystallization control agents, acetaldehyde reducing agents, impact modifiers, catalyst deactivators, melt strength enhancers, anti-static agents, lubricants, chain extenders, nucleating agents, solvents, fillers, and plasticizers.

Finally, as is understood by those familiar with polyester packaging, ultraviolet (UV) radiation absorbers protect polymers and the contents of packages formed from the same. Where UV absorbers are added to the bottle resin during the injection molding process, there is a tendency for such UV absorbers (and when used, reactive carriers that deliver UV absorbers) to leave deposits in the injection molds used for preforms. Such deposits cause the preforms to stick in the injection molds slightly longer, thereby slowing preform manufacturing efficiency.

Without being bound to any particular theory, it is believed that the interaction between a UV absorber and the bottle resin produces byproducts that in turn deposit on the molds in which polyester bottle preforms are manufactured. These deposits cause the preforms to stick in the mold, thereby slowing the production rate of the preform-making process. Calcium carbonate and especially talc have been found to have the beneficial effect of reducing adherence to preform molds, thereby increasing the speed and efficiency of the injection molding process. Accordingly, an embodiment of the polyester resin includes both an inert particulate additive as herein described and a UV absorber.

In the drawings and the specification, typical embodiments of the invention have been disclosed. Specific terms have been used only in a generic and descriptive sense, and not for purposes of limitation. The scope of the invention is set forth in the following claims.

The invention claimed is:

1. A polyester bottle resin, comprising polyethylene terephthalate and less than about 200 ppm of surface-modified talc having an average particle size of less than about ten microns.

2. A polyester bottle resin according to claim 1, comprising less than about 100 ppm of surface-modified talc.

3. A polyester bottle resin according to claim 2, comprising more than about 20 ppm of surface-modified talc.

4. A polyester bottle resin according to claim 1, comprising between about 40 and 100 ppm of surface-modified talc.

5. A polyester bottle resin according to claim 1, wherein the surface-modified talc comprises talc treated with an organosilane coupling agent.

6. A polyester bottle resin according to claim 5, comprising between about 40 and 100 ppm of surface-modified talc.

7. A polyester bottle resin according to claim 1, wherein the surface-modified talc comprises talc treated with an aminosilane coupling agent.

8. A polyester bottle resin according to claim 1, comprising a polyol having a molecular weight of between about 300 and 10,000 g/mol, wherein the polyol (i) is the delivery vehicle for the introduction of the surface-modified talc into the polyethylene terephthalate and (ii) is present in the polyester resin in an amount less than about one weight percent.

9. A polyester bottle resin according to claim 8, wherein the polyol is present in the polyester resin in an amount less than about 500 ppm.

10. A polyester bottle resin according to claim 1, comprising polyethylene glycol having a molecular weight of less than about 10,000 g/mol, wherein the polyethylene glycol (i) is a reactive carrier that introduces the surface-modified talc into the polyethylene terephthalate and (ii) is present in the polyester resin in an amount less than about 0.1 weight percent.

11. A polyester bottle resin, comprising polyethylene terephthalate and less than about 200 ppm of surface-modified talc having an average particle size of less than about two microns.

12. A polyester bottle resin according to claim 11, comprising less than about 100 ppm of surface-modified talc.

13. A polyester bottle resin according to claim 12, comprising more than about 20 ppm of surface-modified talc.

14. A polyester bottle resin according to claim 11, comprising between about 40 and 100 ppm of surface-modified talc.

15. A polyester bottle resin according to claim 11, wherein the surface-modified talc comprises talc treated with an organosilane coupling agent.

16. A polyester bottle resin according to claim 15, comprising between about 40 and 150 ppm of surface-modified talc treated with an organosilane coupling agent.

17. A polyester bottle resin according to claim 16, wherein the surface-modified talc comprises talc treated with an aminosilane coupling agent at a loading of between about 0.5 and one weight percent.

18. A polyester bottle resin according to claim 15, comprising between about 60 and 100 ppm of surface-modified talc treated with an organosilane coupling agent.

19. A polyester bottle resin according to claim 11, comprising polyethylene glycol having a molecular weight of less than about 10,000 g/mol, wherein the polyethylene glycol (i) is a reactive carrier that introduces the surface-modified talc into the polyethylene terephthalate and (ii) is present in the polyester resin in an amount less than about 500 ppm.

20. A polyester container, comprising:
polyethylene terephthalate polymers; and
surface-modified talc having an average particle size of less than about ten microns, the surface-modified talc being present in said polyester container in an amount less than about 200 ppm.

21. A polyester container according to claim 20, wherein the surface-modified talc has an average particle size of less than about two microns.

22. A polyester container according to claim 20, wherein the surface-modified talc is present in said polyester container in an amount between about 40 and 150 ppm.

23. A polyester container according to claim 20, wherein the surface-modified talc is present in said polyester container in an amount between about 60 and 100 ppm.

24. A polyester container according to claim 20, wherein the surface-modified talc is treated with an organosilane coupling agent.

25. A polyester container according to claim 20, wherein, as compared with an otherwise identical container without talc, said polyester container possesses reduced coefficient of friction and comparable sidewall haze.

26. A polyester container according to claim 20, wherein, as compared with an otherwise identical container without talc, said polyester container possesses reduced coefficient of friction of about 90 percent.

27. A polyester container according to claim 20, wherein said polyester container is a straight-walled two-liter soft drink bottle.

28. A polyester container, comprising:
polyethylene terephthalate polymers; and
less than about 200 ppm of surface-modified talc having an average particle size of less than about ten microns;
wherein said polyester container possesses reduced coefficient of friction as compared with an otherwise identical talc-free container.

29. A polyester container according to claim 28, wherein the surface-modified talc has an average particle size of less than about two microns.

30. A polyester container according to claim 29, wherein the surface-modified talc is present in said polyester container in an amount less than 150 ppm.

31. A polyester container according to claim 28, wherein the surface-modified talc is present in said polyester container in an amount less than 100 ppm.

32. A polyester container according to claim 31, wherein the surface-modified talc is present in said polyester container in an amount more than 20 ppm.

33. A polyester container according to claim 28, wherein the surface-modified talc is treated with an organosilane coupling agent.

34. A polyester bottle, comprising:
polyethylene terephthalate polymers; and
talc treated with a organosilane coupling agent, the talc being present in said polyester bottle in an amount between about 40 and 150 ppm;
wherein, as compared with an otherwise identical polyester bottle without talc, said polyester bottle possesses reduced coefficient of friction; and
wherein, as compared with an otherwise identical polyester bottle that includes talc without surface modification, said polyester bottle possesses reduced sidewall haze.

35. A polyester bottle according to claim 34, wherein the organosilane-treated talc has an average particle size of less than about ten microns.

36. A polyester bottle according to claim 34, wherein the organosilane-treated talc has an average particle size of less than about two microns.

37. A polyester bottle according to claim 34, wherein, as compared with an otherwise identical talc-free bottle, said polyester bottle possesses a 90-percent reduction in coefficient of friction.

* * * * *